(12) United States Patent
Kim

(10) Patent No.: US 11,582,426 B2
(45) Date of Patent: Feb. 14, 2023

(54) METHOD AND APPARATUS FOR SENSING MOVING BALL

(71) Applicant: GOLFZON Co., Ltd., Daejeon (KR)

(72) Inventor: Se Hwan Kim, Daegu (KR)

(73) Assignee: GOLFZON Co., Ltd., Daejeon (KR)

( * ) Notice: Subject to any disclaimer, the term of this patent is extended or adjusted under 35 U.S.C. 154(b) by 507 days.

(21) Appl. No.: 16/112,750

(22) Filed: Aug. 26, 2018

(65) Prior Publication Data

US 2018/0367764 A1    Dec. 20, 2018

Related U.S. Application Data

(63) Continuation of application No. 14/759,654, filed as application No. PCT/KR2014/000199 on Jan. 8, 2014, now abandoned.

(30) Foreign Application Priority Data

Jan. 8, 2013    (KR) .................. 10-2013-0002204

(51) Int. Cl.
*H04N 7/18* (2006.01)
*G06K 9/62* (2022.01)
(Continued)

(52) U.S. Cl.
CPC ........... *H04N 7/181* (2013.01); *G06K 9/6215* (2013.01); *G06T 7/246* (2017.01); *G06T 7/593* (2017.01);
(Continued)

(58) Field of Classification Search
CPC .. H04N 7/181; H04N 13/0239; H04N 13/239; G06T 7/246; G06T 7/73; G06T 7/593; G06K 9/00711; G06K 9/711; G06K 9/52; G06K 9/6215

USPC ......................................................... 348/157
See application file for complete search history.

(56) References Cited

U.S. PATENT DOCUMENTS 6,592,465 B2    7/2003 Lutz et al.
7,209,576 B2    4/2007 Rankin
(Continued)

FOREIGN PATENT DOCUMENTS

JP    1994-137837 A    5/1994
JP    2004-061483 A    2/2004
(Continued)

OTHER PUBLICATIONS

International Search Report for PCT/KR2014/000199 dated Feb. 28, 2014 from Korean Intellectual Property Office.

*Primary Examiner* — Joseph G Ustaris
*Assistant Examiner* — Jimmy S Lee
(74) *Attorney, Agent, or Firm* — Revolution IP, PLLC

(57) ABSTRACT

Provided are an apparatus and method for sensing a moving ball, which extract a feature portion such as a trademark, a logo, etc. indicated on a ball from consecutive images of a moving ball, acquired by an image acquisition unit embodied by a predetermined camera device, and calculate a spin axis and spin amount of rotation the moving ball based on the feature portion and thus spin of the ball is simply, rapidly, and accurately calculated with low computational load, thereby achieving rapid and stable calculation of the ball in a relatively low performance system. The sensing apparatus includes an image acquisition unit for acquiring consecutive images, an image processing unit for extracting a feature portion from the acquired image, and a spin calculation unit for calculating spin using the extracted feature portion.

4 Claims, 9 Drawing Sheets

(51) Int. Cl.
*G06T 7/73* (2017.01)
*G06T 7/593* (2017.01)
*G06T 7/246* (2017.01)
*H04N 13/239* (2018.01)
*G06V 10/42* (2022.01)
*G06V 20/40* (2022.01)
*H04N 13/00* (2018.01)
*G03B 35/08* (2021.01)

(52) U.S. Cl.
CPC ............... *G06T 7/73* (2017.01); *G06V 10/42* (2022.01); *G06V 20/40* (2022.01); *H04N 13/239* (2018.05); *G03B 35/08* (2013.01); *G06T 2207/10021* (2013.01); *G06T 2207/30204* (2013.01); *H04N 2013/0085* (2013.01)

(56) References Cited

U.S. PATENT DOCUMENTS

| | | |
|---|---|---|
| 2003/0228007 A1 | 12/2003 | Kurosaki |
| 2004/0030527 A1 | 2/2004 | Rankin |
| 2004/0076311 A1 | 4/2004 | Miki et al. |
| 2005/0233816 A1 | 10/2005 | Nishino et al. |
| 2006/0008116 A1* | 1/2006 | Kiraly et al. ............ G06T 7/20 382/103 |
| 2009/0042627 A1* | 2/2009 | Nicora ............... A63B 24/0003 463/2 |
| 2010/0210377 A1* | 8/2010 | Lock ................. A63B 24/0003 473/409 |
| 2011/0273562 A1* | 11/2011 | Dawe et al. ....... A63B 24/0021 348/139 |
| 2011/0292203 A1* | 12/2011 | Kim ................... A63B 24/0021 348/135 |
| 2012/0082347 A1 | 4/2012 | Kim et al. |

FOREIGN PATENT DOCUMENTS

| | | |
|---|---|---|
| JP | 2004-132831 A | 4/2004 |
| JP | 2004-184236 A | 7/2004 |
| JP | 2005-291824 A | 10/2005 |
| JP | 2006-505292 A | 2/2006 |
| JP | 2006-139374 A | 6/2006 |
| JP | 2010-165183 A | 7/2010 |
| KR | 10-2006-0045366 A | 5/2006 |
| KR | 10-2012-0033946 A | 4/2012 |

* cited by examiner

METHOD AND APPARATUS FOR SENSING MOVING BALL

CROSS REFERENCE TO PRIOR APPLICATION

This application is a Continuation of U.S. patent application Ser. No. 14/759,654 filed Jul. 8, 2015, which is a National Stage Application of PCT International Patent Application No. PCT/KR2014/000199 filed on Jan. 8, 2014, under 35 U.S.C. § 371, which claims priority to Korean Patent Application No. 10-2013-0002204 filed on Jan. 8, 2013, which are all hereby incorporated by reference in their entirety.

BACKGROUND

The present invention relates to a method and apparatus for sensing a moving ball for acquiring an image of the moving ball and processing and analyzing the image to calculate the spin of the ball.

With regard to sports games, specifically, golf, attempts have always been made to accurately sense the physical characteristics of a moving ball that is hit by a golfer, to analyze the ball in flight or to realize the ball in flight in the form of an image using the sensed value, and to apply the result to simulated golf such as so-called screen golf.

In particular, when a ball is hit to fly, the ball rotates at very high speed with respect to an axis in a three-dimensional space, and thus, it is very difficult to measure spin of the ball and very expensive equipment is required to accurately measure the spin of the ball. A representative method for measuring spin of a ball is a method using a radar sensor.

However, such an expensive sensing apparatus is not appropriate for a general-purpose sensing apparatus for analysis of a ball in flight in so-called screen golf or on a driving range, which senses a ball in flight according to golf swing, calculates a trajectory of the ball, and allows golf simulation on a virtual golf course based on the calculated trajectory. There is a need to a technology for rapidly and accurately sensing spin of a ball also in a relatively inexpensive and low-performance system.

Therefore, the present invention has been made in view of the above problems, and it is an object of the present invention to provide an apparatus and method for sensing a moving ball, which extract a feature portion such as a trademark, a logo, etc. indicated on a ball from consecutive images of a moving ball, acquired by an image acquisition unit embodied by a predetermined camera device, and calculate a spin axis and spin amount of rotation the moving ball based on the feature portion and thus spin of the ball is simply, rapidly, and accurately calculated with low computational load, thereby achieving rapid and stable calculation of the ball in a relatively low performance system.

SUMMARY

In accordance with an aspect of the present invention, the above and other objects can be accomplished by the provision of an apparatus for sensing a moving ball, for acquiring and analyzing an image of the moving ball to calculate spin of the moving ball, the apparatus including an image acquisition unit for acquiring consecutive images according to movement of a ball with a surface having a predetermined feature portion indicated thereon, an image processing unit for extracting only a feature portion of a ball portion from each of images consecutively acquired by the image acquisition unit, and a spin calculation unit for comparing and analyzing position information of each pixel of a feature portion obtained by applying a trial spin axis and a trial spin amount to position information of pixels constituting a feature portion of a ball portion on a first image as a preceding image among two consecutively acquired images of a moving ball, and position information of each pixel constituting a feature portion of a ball portion of a second image as a subsequent image among the two consecutively acquired images, to calculate a spin axis and spin amount according to ball movement to the second image from the first image.

In accordance with another aspect of the present invention, there is provided an apparatus for sensing a moving ball, for acquiring and analyzing an image of the moving ball to calculate spin of the moving ball, the apparatus including an image acquisition unit for acquiring consecutive images according to movement of a ball with a surface having a predetermined feature portion indicated thereon, an image processing unit for extracting a feature portion on a ball portion from each of images consecutively acquired by the image acquisition unit and extracting a feature portion from the ball portion to prepare a feature portion image of each of the consecutive images, and a spin calculation unit for calculating a spin axis and spin amount in a three-dimensional space to convert a feature portion image of a preceding image of two consecutive feature portion images into a feature portion image of a subsequently acquired image.

In accordance with another aspect of the present invention, there is provided a method of sensing a moving ball, for acquiring and analyzing an image of the moving ball to calculate spin of the moving ball, the method including acquiring consecutive images according to movement of a ball with a surface having a predetermined feature portion indicated thereon, extracting the feature portion indicated on one side of a ball portion of each of the consecutively acquired images, calculating position information of each pixel of a feature portion obtained by applying a trial spin axis and a trial spin amount to position information of pixels constituting a feature portion of a ball portion on a first image as a preceding image among two consecutively acquired images of a moving ball; and comparing and analyzing position information of each pixel constituting a feature portion of a ball portion of a second image as a subsequent image among the two consecutively acquired images with the position information of each of the pixels of the feature portion obtained by applying the trial spin axis and spin amount, to calculate a spin axis and spin amount according to ball movement to the second image from the first image.

In accordance with another aspect of the present invention, there is provided a method of sensing a moving ball, for acquiring and analyzing an image of the moving ball to calculate spin of the moving ball, the method including acquiring consecutive images according to movement of a ball with a surface having a predetermined feature portion indicated thereon, extracting a feature portion from a ball portion from each of the consecutively acquired images to prepare a feature portion image, and searching for a spin axis and spin amount in three-dimensional space, for allowing a feature portion image of a first acquired image of two consecutively acquired images into a feature portion image of a second acquired image.

An apparatus and method for sensing a moving ball according to the present invention may extract a feature portion such as a trademark, a logo, etc. indicated on a ball from consecutive images of a moving ball, acquired by an image acquisition unit embodied by a predetermined camera device, and calculate a spin axis and spin amount of rotation the moving ball based on the feature portion and thus spin of the ball is simply, rapidly, and accurately calculated with low computational load, thereby achieving rapid and stable calculation of the ball in a relatively low performance system.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Hereinafter, exemplary embodiments of a method and apparatus for sensing a moving ball according to the present invention will be described in detail with reference to the accompanying drawings.

The present invention may be basically configured to photograph a golf ball (hereinafter, referred to as a "ball"), which is hit by a golf club of a user, via a predetermined camera, to analyze the captured image, and to calculate spin of the ball in flight. Here, the camera may be a three-dimensional camera or a stereo camera configured by a plurality of cameras in a stereo manner and may be configured to convert coordinates of a two-dimensional image of the ball into three-dimensional coordinates or vice versa.

In addition, the method and apparatus for sensing a moving ball according to the present invention may be applied to various fields such as analysis of a ball in flight according to golf swing of a user, a virtual golf using a virtual reality-based simulation, and so on.

First, an apparatus for sensing a moving ball according to an embodiment of the present invention will be described with reference to FIGS. 1 and 2.

Figure 1:
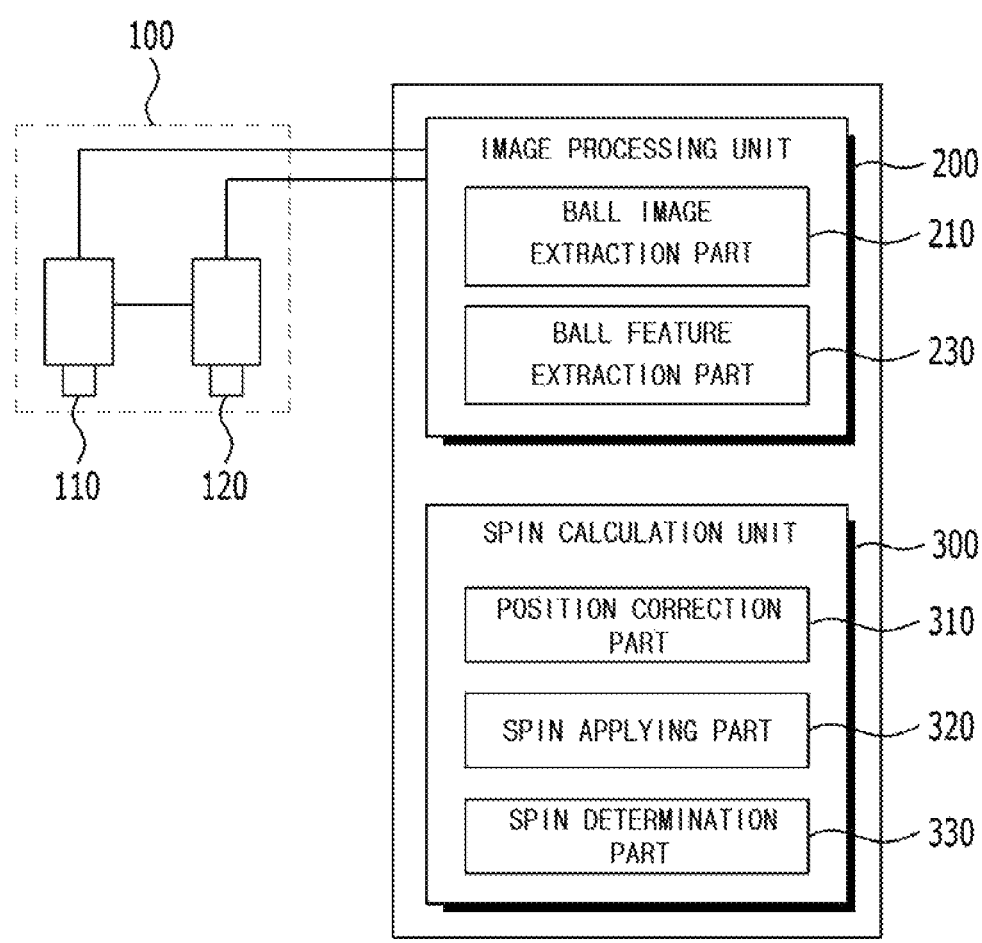
FIG. 1 is a schematic block diagram illustrating a structure of an apparatus for sensing a moving ball according to an embodiment of the present invention.
Figure 2:
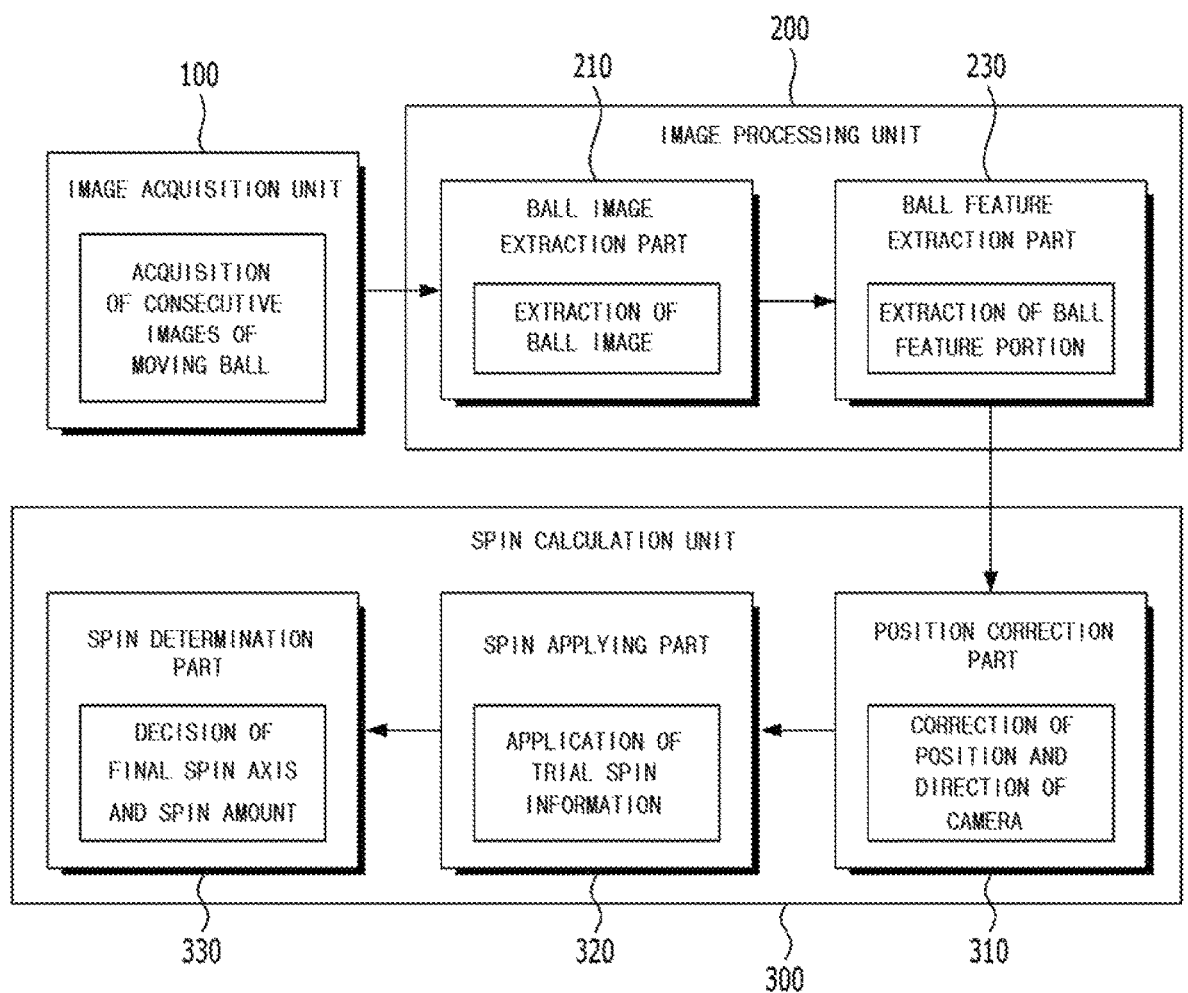
FIG. 2 is a diagram for explanation of functions of components from image acquisition to calculation of spin of a ball using components illustrated in FIG. 1.

As illustrated in FIGS. 1 and 2, an apparatus for sensing a moving ball according to an embodiment of the present invention includes an image acquisition unit 100, an image processing unit 200, and a spin calculation unit 300.

The image acquisition unit 100 may be a camera device and may be embodied through a three-dimensional camera device or a stereo camera including a plurality of cameras, as described in the background art. FIG. 1 illustrates a case in which the image acquisition unit 100 is embodied as a stereo camera device including a first camera 110 and a second camera 120.

The image processing unit 200 is a component that extracts a ball image that is an image corresponding to a ball portion from each image acquired by the image acquisition unit 100 and removes a dimple portion and various noise portions from the ball image to extract a feature portion of the ball image, that is, an unspecified indication such as a trademark or a logo indicated on the ball, a scratch, etc.

The image processing unit 200 may include a ball image extraction part 210 and a ball feature extraction part 230.

The ball image extraction part 210 is configured to extract a ball image that is an image corresponding to a ball portion from a source image that is an image acquired by the image acquisition unit 100 and to extract a central coordinate of the ball portion, which will be described below in detail.

The ball feature extraction part 230 is a component that normalizes size, brightness, and so on of each ball image extracted by the ball image extraction part 210 and extracts the feature portion (i.e., an unspecified indication such as a trademark or a logo indicated on the ball, a scratch, etc.) indicated on the image, which will be described below in detail.

The spin calculation unit 300 is configured to analyze a position change in feature portions that are respectively extracted from two consecutive ball images, that is, to analyze a spin axis and spin amount in a predetermined three-dimensional space, by which a feature portion of a preceding image is converted into a feature portion on a subsequent image to calculate final spin axis and spin amount information of the ball. As illustrated in FIGS. 1 and 2, the spin calculation unit 300 includes a position correction part 310, a spin applying part 320, and a spin determination part 330.

The position correction part 310 facilitates spin calculation when balls in two consecutive images are viewed at corresponding positions and the same angle for spin calculation of a ball to accurately calculate spin, which will be described below in detail.

According to the present invention, analysis is basically performed in units of images among images of a consecutively photographed moving ball. When a preceding image is referred to as a first image and a subsequent image is referred to as a second image, spin when a ball state of a point for acquisition of the first image is converted into a ball state of a point for acquisition of the second image may be calculated and, in detail, may be calculated using a method of calculating a spin axis and spin amount for allowing a position of a feature portion in the first image to be converted into a position of a feature portion of the second image.

The spin applying part 320 extracts and applies trial spin axis and spin amount information in order to calculate the spin axis and spin amount for allowing the position of the feature portion on the first image to be converted into the position of the feature portion of the second image. Thus, the spin determination part 330 may determine whether the trial spin axis and spin amount information applied by the spin applying part 320 are close to target spin axis and spin amount information to calculate final spin information.

That is, until the final spin information is calculated, the spin applying part 320 extracts and applies a trial spin axis and a trial spin amount every time, and the spin determination part 330 checks the application result and determines the most appropriate trial spin information as final spin information, which will be described below in detail.

Figure 3:
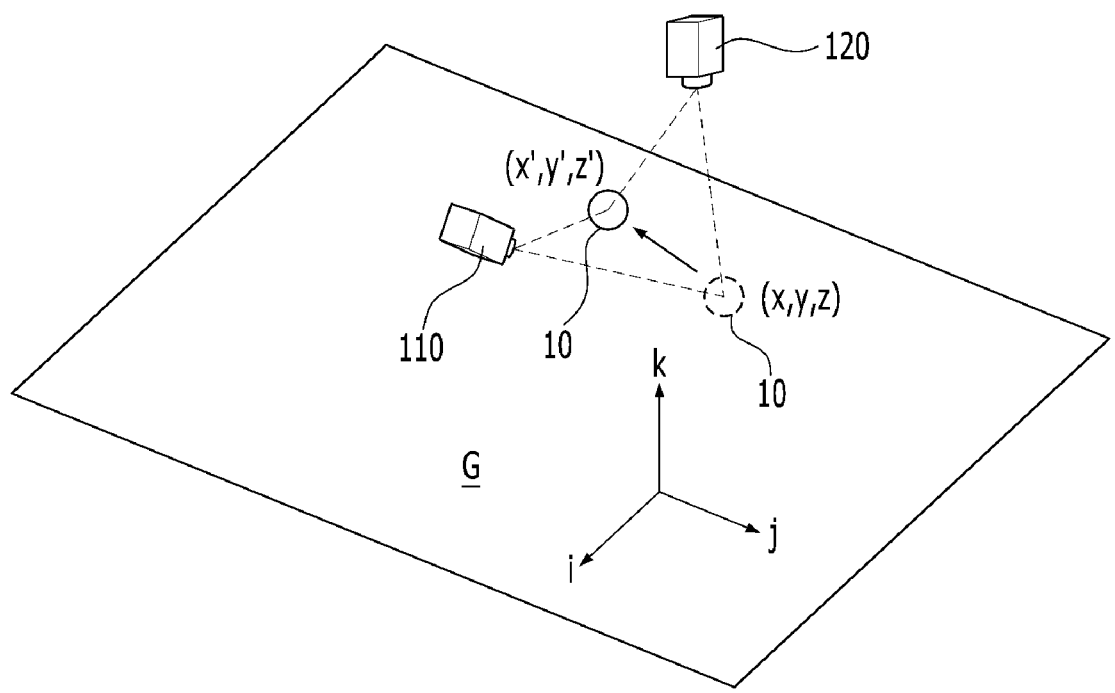
FIG. 3 is a diagram illustrating of a moving ball and two cameras configured in a stereo manner as an image acquisition unit according to an embodiment of the present invention.

As illustrated in FIG. 3, position information may be obtained at positions where ball images are respectively acquired by the first camera 110 and the second camera 120 according to movement of a ball 10 from the ball images based on an i, j, and k coordinate system of a ground surface G.

That is, the first camera 110 and the second camera 120 may each be an image acquisition device having a stereoscopic configuration, and thus, may extract three-dimensional coordinate information of an object from images acquired by photographing the same object via two cameras, i.e., the first camera 110 and the second camera 120. In FIG. 3, as the ball 10 moves from a first position to a second position, coordinate information (x, y, z) of the first position and coordinate information (x', y', z') of the second position may be extracted. In this case, the first camera 110 and the second camera 120 are fixed. Accordingly, position coordinates of the first camera 110 and the second camera 120 may be recognized and may always be fixed.

Figure 4A:
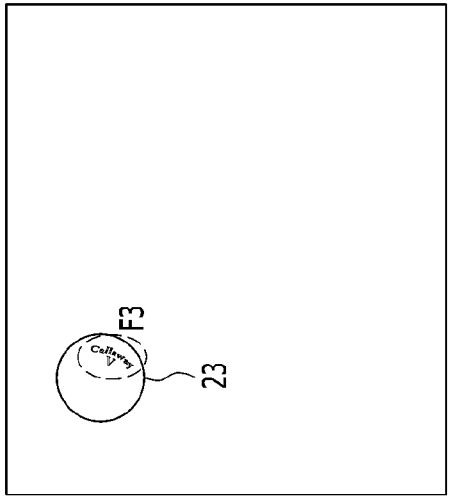
FIGS. 4(a), 4(b), and 4(c) are source images of consecutively acquired images.
Figure 4B:
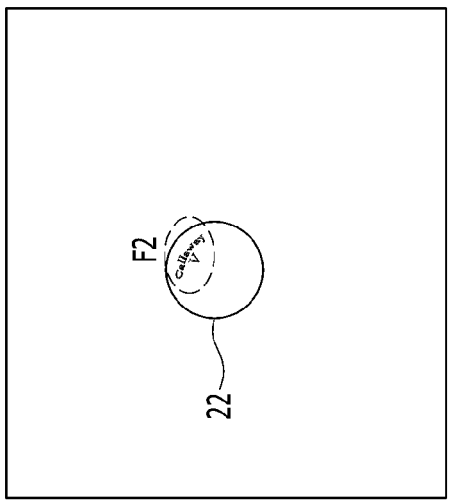
Figure 4C:
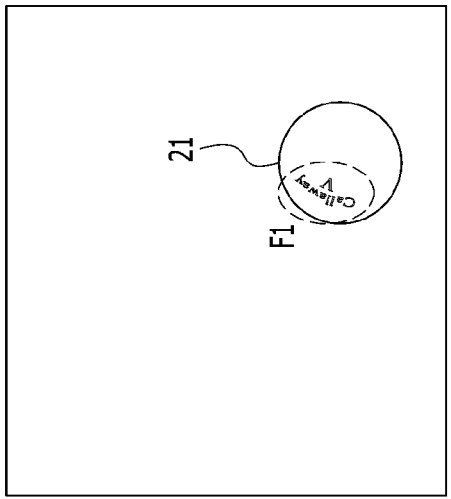

In this state, some of consecutively acquired images of any one camera are illustrated in FIGS. 4(*a*), 4(*b*), and 4(*c*).

That is, FIGS. 4(*a*), 4(*b*), and 4(*c*) illustrate images in states in which only ball portions 21, 22, and 23 remain by removing a background portion and so on using a differential image from images acquired by photographing a moving ball within a viewing angle via a fixed camera at a predetermined time interval.

As seen from FIGS. 4(*a*), 4(*b*), and 4(*c*), a current state is a state in which a ball flies in a left diagonal direction. As seen from FIGS. 4(*a*), 4(*b*), and 4(*c*), when the ball approaches a camera, the viewed ball is enlarged like the ball portion 21 as illustrated in FIG. 4(*a*), and then, as the ball gradually moves away from the camera, the viewed ball becomes smaller like the ball portions 22 and 23 as illustrated in FIGS. 4(*b*) and 4(*c*).

Here, the images illustrated in FIGS. 4(*a*), 4(*b*), and 4(*c*), that is, an image of a ball portion as a moving portion, remaining after removal of a background portion and various noise portions from an initially acquired image via a differential image, etc., is referred to as a source image.

With regard to the ball portions 21, 22, and 23 on the source image, positions of feature portions F1, F2, and F3 indicated on a surface of the ball change as the ball rotates.

Here, interest objects are the feature portions F1, F2, and F3 on the ball. In this regard, the feature portions F1, F2, and F3 may be accurately extracted and a position change of the feature portions F1, F2, and F3 may be analyzed to calculate spin of the ball.

To this end, it is necessary to effectively extract only images of the ball portions 21, 22, and 23, that is, only a ball image from the source image, as illustrated in FIG. 4.

Figure 5A:
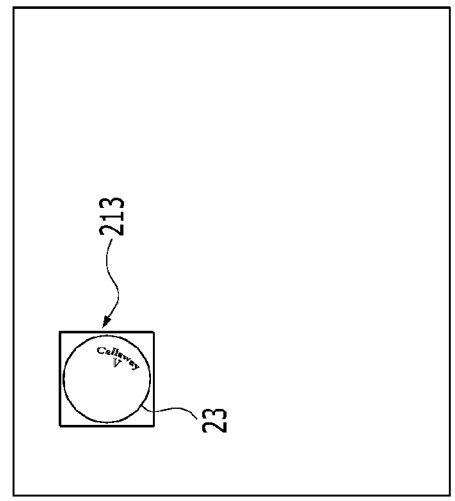
FIGS. 5(a), 5(b), and 5(c) are diagram for explanation of a procedure of extracting a ball portion from the source image illustrated in FIGS. 4(a), 4(b), and 4(c), respectively.
Figure 5B:
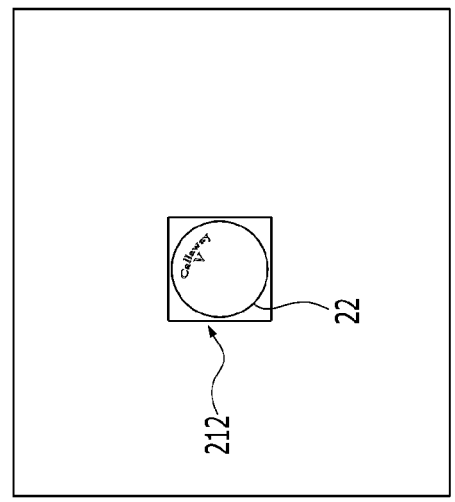
Figure 5C:
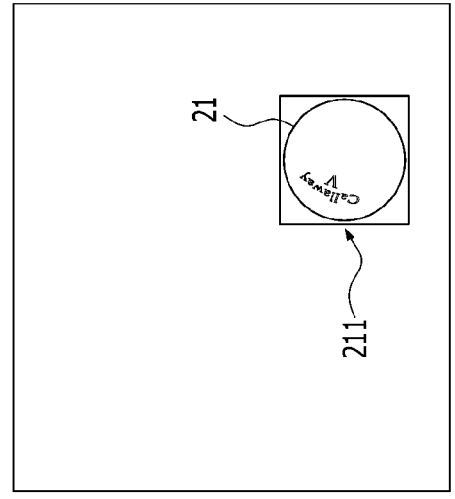
Figure 6:
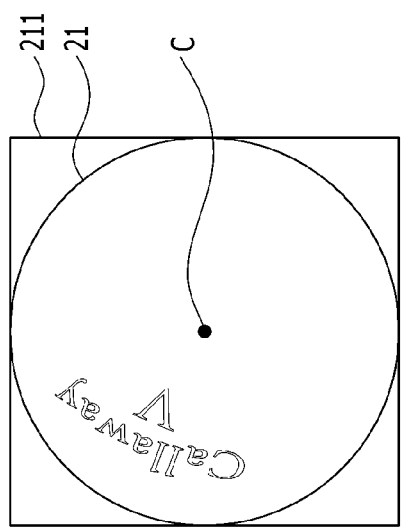
FIG. 6 is a diagram for explanation of an exemplary extraction method for extraction of a ball portion of FIG. 5.

FIGS. 5(*a*), 5(*b*), and 5(*c*) illustrate a procedure of extracting only a ball portion from each source image. First, the ball portions 21, 22, and 23 may be accurately extracted from source images such that a central point C of the ball portion 21 is a central portion of an extracted ball image 211 and an outline of the ball portion 21 substantially corresponds to an outline of the extracted image 211 as illustrated in FIG. 6.

Images obtained by extracting only the ball portions 21, 22, and 23 from the respective source images, that is, ball images 211, 212, and 213 have sizes corresponding to ball portions on the respective source images, and thus, have different sizes. The ball images 211, 212, and 213 indicated in the respective source images are differently affected by illumination according to a distance from a camera, and thus, brightness also varies for each respective ball image.

In order to accurately extract a ball feature portion, it is necessary to equalize the sizes of the ball images 211, 212, and 213 and normalize the brightness of the ball images 211, 212, and 213.

Figure 7C:
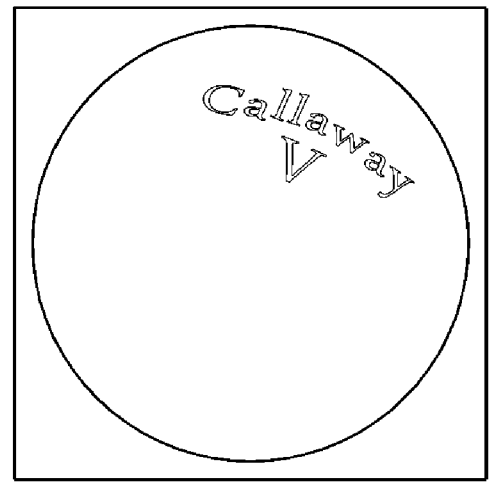
FIGS. 7(a), 7(b), and 7(c) illustrate normalized images of extracted ball images illustrated in FIGS. 5(a), 5(b), and 5(c), respectively.
Figure 7B:
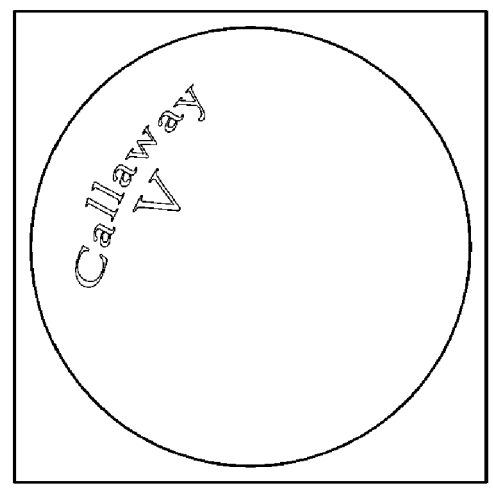
Figure 7A:
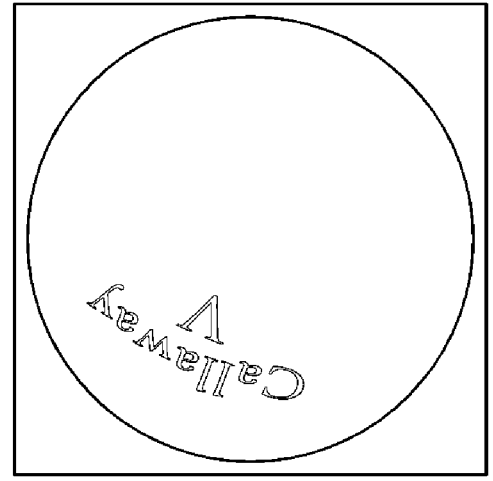

FIGS. 7(*a*), 7(*b*), and 7(*c*) illustrate images containing ball images corresponding to FIGS. 5(*a*), 5(*b*), and 5(*c*), the size and brightness of which are normalized.

That is, the ball images 211, 212, and 213 may be enlarged or reduced according to respective preset sizes or remaining ball images may be enlarged or reduced based on any one of the ball images 211, 212, and 213, that is, a normalization process may be performed on each ball image, thereby equalizing the sizes of ball images 211, 212, and 213.

In addition, a normalization process may be performed on each ball image using an average value of all pixels constituting a ball portion to equalize overall brightnesses of ball images.

As described above, after normalization is completed on each ball image, extraction of a ball feature portion using a ball feature extraction part is performed on each normalized ball image, as illustrated in FIG. 8.

That is, when a ball image of FIG. 8(*a*) is a first ball image and a ball image of FIG. 8(*b*) is a second ball image, the first ball image is a first acquired image of two consecutively acquired images and the second ball image is a second acquired image of the two images. FIG. 8(*c*) illustrates a first feature portion image having a feature portion FC1 obtained by completely extracting the feature portion F1 from the first ball image. FIG. 8(*d*) illustrates a second feature portion image having a feature portion FC2 obtained by completely extracting the feature portion F2 on the second ball image.

Here, the feature portion may be extracted using various image processing schemes such as a differential image scheme and so on.

When feature portion images having the extracted feature portions FC1 and FC2 are prepared, a procedure of calculating spin information of a moving ball is performed using a spin calculation unit.

Figure 9:
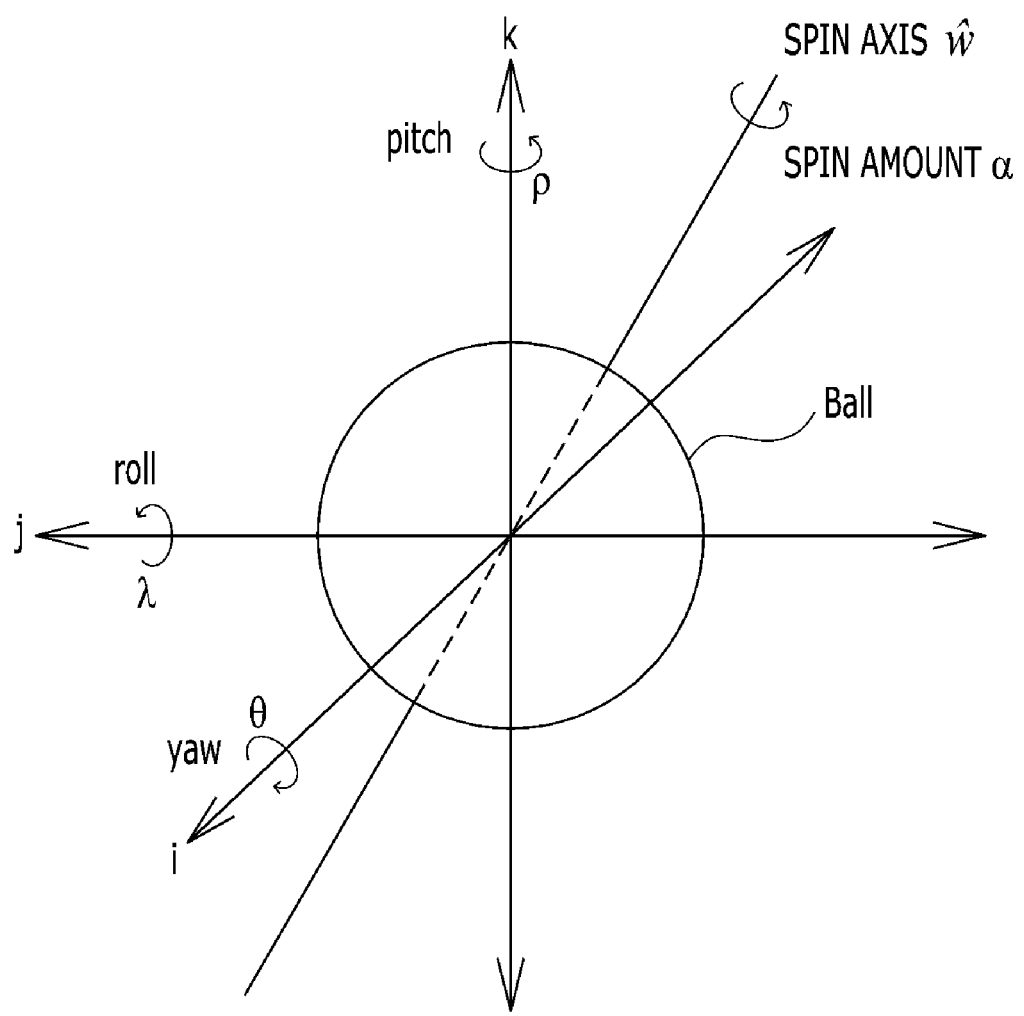
FIG. 9 is a diagram for explanation of calculation of spin of a moving ball.

Here, the spin of the ball may be calculated by calculating coordinate information about a spin axis in a three-dimensional space based on an i-axis, j-axis, and k-axis coordinate system and an angle for rotation with respect to the spin axis, that is, information about a spin amount, as illustrated in FIG. 9.

As illustrated in FIG. 9 components for representing rotational motion in three-dimensional space include pitch, yaw, and roll (for example, when a spin axis corresponds to a k axis, a ball has only side spin, and when the spin axis corresponds to an i axis, the ball has only back spin or forward spin). In addition, when a rotational component in an i-axis direction is θ, a rotational component in a j-axis direction is λ, and a rotational component in a k-axis direction is ρ, a vector of target spin may be represented according to Equation 1 below.

$$\vec{\omega} = \theta i + \lambda j + \rho k \qquad \text{[Equation 1]}$$

Based on the spin vector (ω), the spin axis information and the spin amount information may be calculated according to Equations 2 and 3 below, respectively. Here, α is the spin amount information.

$$\hat{\omega} = \left(\frac{\theta}{\alpha}, \frac{\lambda}{\alpha}, \frac{\rho}{\alpha}\right) \quad \text{[Equation 2]}$$

$$\alpha = \sqrt{\theta^2 + \lambda^2 + \rho^2} \quad \text{[Equation 3]}$$

Accordingly, the spin axis and spin amount information may be obtained by calculating θ as a yaw rotational component of spin of a moving ball, λ as a roll rotational component, and ρ as a pitch rotational component.

The spin axis and spin amount information may be obtained from a feature portion extracted from the ball image shown in FIG. 7.

Figure 8A:
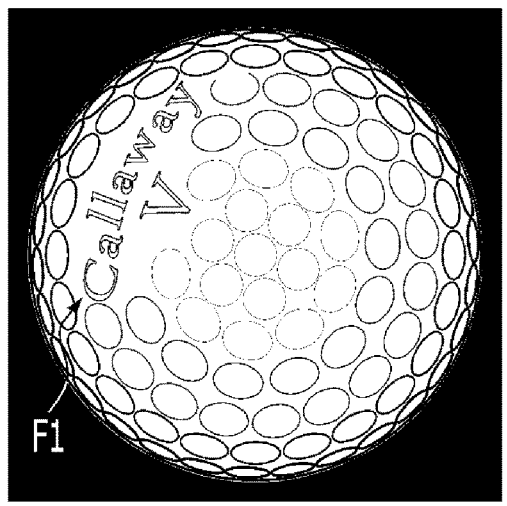
FIGS. 8(a) and 8(b) are normalized images of ball images extracted from two consecutive source images, respectively.
Figure 8B:
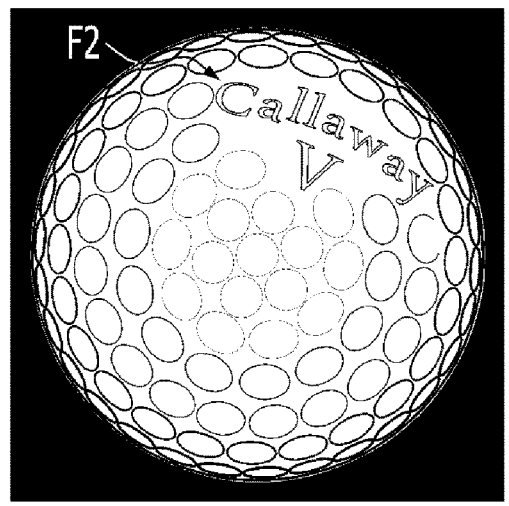
Figure 8C:
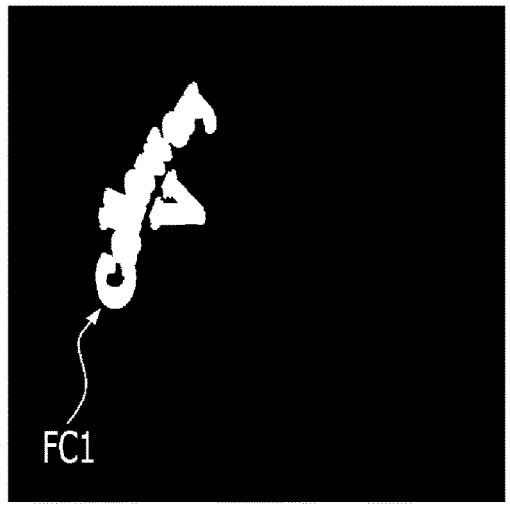
FIGS. 8(c) and 8(d) illustrate feature portion images extracted from the images illustrated in FIGS. 8(a) and 8(b)
Figure 8D:
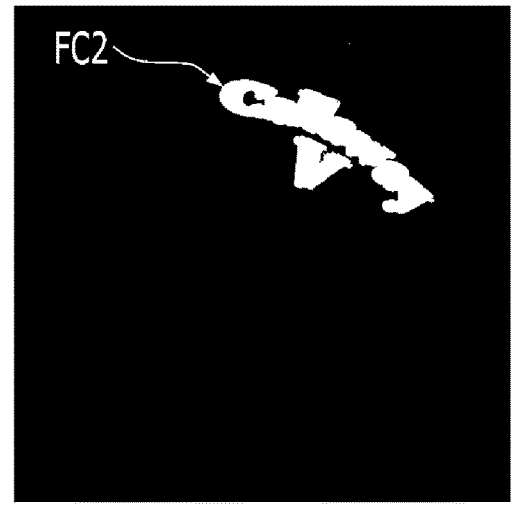

That is, as illustrated in FIG. 8, the spin axis and spin amount may be extracted using feature portion images (FIGS. 8(c) and 8(d)) of two consecutive ball images.

To this end, first, it is necessary to correct position information of each pixel constituting the feature portion.

That is, with regard to positions of a ball on an image acquired by a camera, a spin axis and spin amount are differently viewed according to a direction in which the camera is directed, and thus, it is necessary to accurately establish a reference and to calculate an absolute spin axis and spin amount based on the reference. To this end, position and direction information of the camera may be corrected as if respective balls on consecutively acquired images are viewed at the same position and direction with respect to the camera, thereby accurately calculating spin information of the ball.

Figure 10:
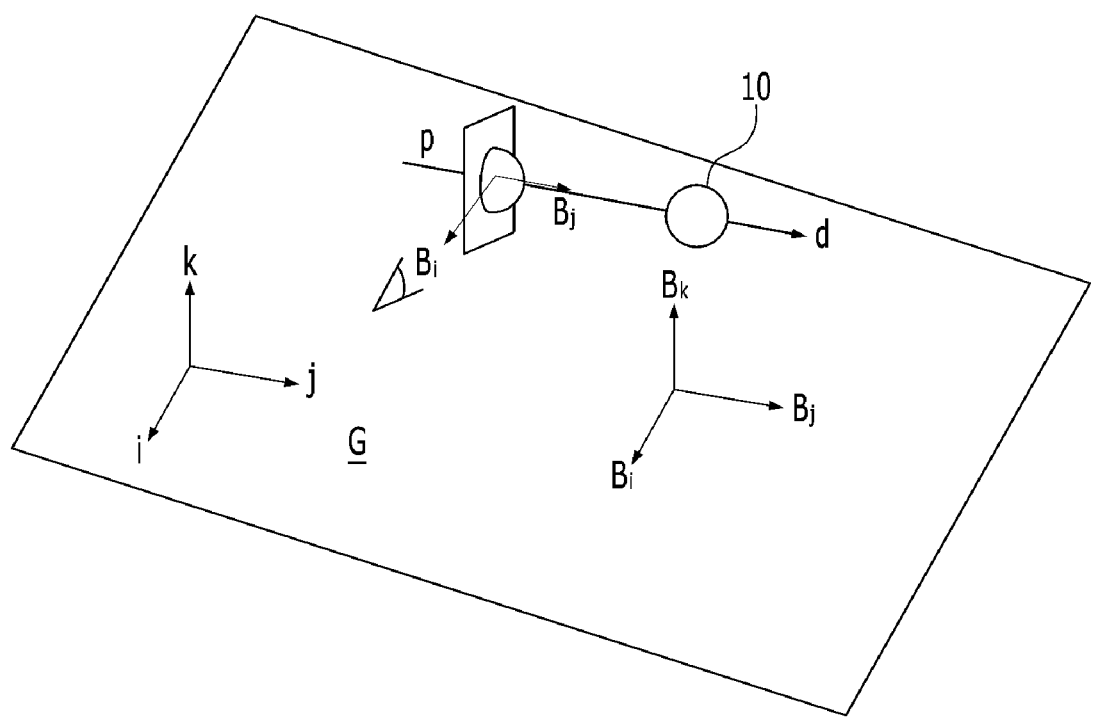
FIGS. 10 and 11 are diagrams for explanation of a principle for correcting a position and direction of a camera for calculation of spin of a ball.
Figure 11:
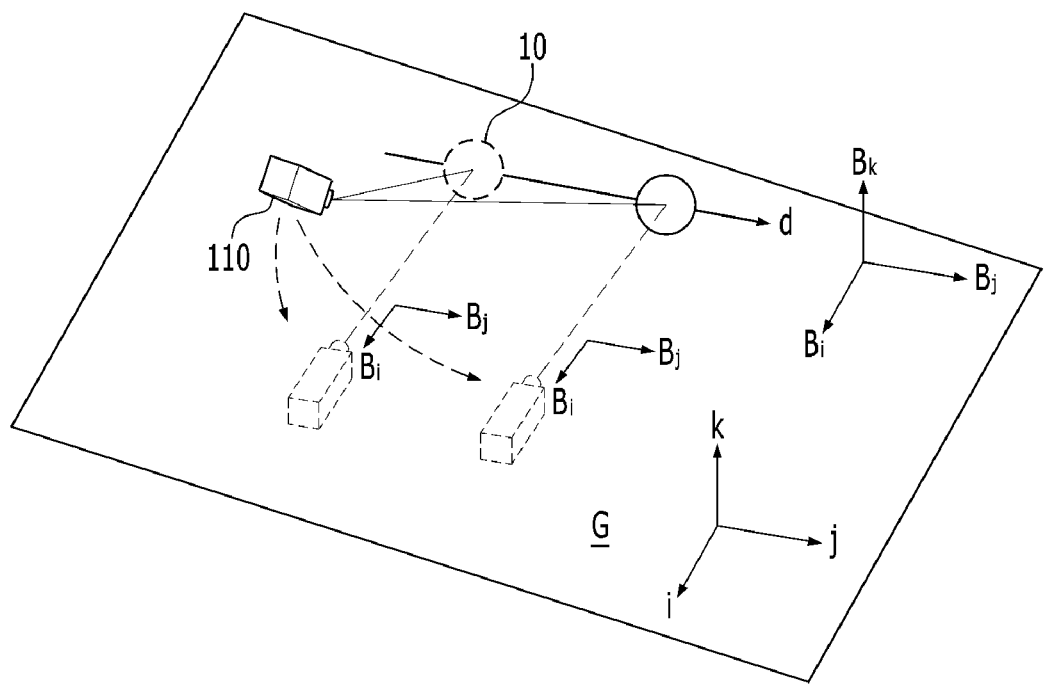

FIGS. 10 and 11 are diagrams for explanation of a principle of the aforementioned position correction.

The sensing apparatus and method according to the present invention calculates spin information from position change of a feature portion of two consecutive images. In order to accurately calculate the spin information, a pair of consecutive images needs to be viewed at the same position and direction. That is, it is necessary to correct consecutive acquired images as if respective balls on the images are viewed at the same position and direction with respect to the camera while the camera moves together with the ball (a passing ball is always photographed by a fixed camera).

As an example for establishing references of a position and direction of the camera, as illustrated in FIG. 10, when the ball 10 moves in a direction d, a direction Bi that is a vector component in parallel to the ground surface G and is contained in a plan p orthogonal to a vector component Bj corresponding to a direction in which the ball 10 proceeds may be established as a reference.

That is, as illustrated in FIG. 11, it is necessary to generate position correction information for correction of the position and direction of a camera 110 and to apply the position correction information to spin calculation as if ball images acquired by the camera 110 are viewed in a direction of the direction vector Bi that is parallel to the ground surface G and perpendicular to the direction vector Bj in which the ball 10 moves for each respective position.

The position correction may be achieved by correcting an angle at which a ball is viewed with respect to a camera, using coordinate information of a fixed camera and central coordinate information of the ball, which are already known. The position correction may be achieved by applying information about a portion to be corrected to position coordinates of pixels each extracted feature portion instead of actually correcting an image.

Position information of each pixel constituting the first feature portion FC1 (refer to FIG. 8) is converted into three-dimensional position information, a resulting value is obtained by applying the aforementioned position correction information and applying trial spin axis and spin amount to the three-dimensional position information, and then, the resulting information is re-converted into two-dimensional position information.

Comparing the converted two-dimensional position information with the position information of pixels constituting the second feature portion, when the converted two-dimensional position information corresponds to the position information of pixels constituting the second feature portion, the applied trial spin axis and spin amount information may be accurate target spin axis and spin amount information.

Accordingly, as described above, the sensing apparatus and method according to the present invention may repeatedly apply trial spin axis and spin amount information to obtain position information and may find spin axis and spin amount information that correspond to the obtained position information at a predetermined level or more to calculate final spin information.

This is represented according to the following equations.

This may be represented by converting position information of pixels constituting each of the first and second feature portions into three-dimensional position information according to Equations 4 and 5 below.

$$PC1set\_3D = C1*P1set\_3D \quad \text{[Equation 4]}$$

$$PC2set\_3D = C2*P2set\_3D \quad \text{[Equation 5]}$$

In Equations 4 and 5, P1set_3D is a matrix obtained by converting P1 set into three-dimensional coordinate information, where P1set is a matrix of coordinates (two-dimensional coordinates) of each pixel on the first feature portion FC1 (refer to FIG. 8).

P2set_3D is a matrix obtained by converting P2set into three-dimensional coordinate information, where P2set is a matrix of coordinates (two-dimensional coordinates) of each pixel on the second feature portion FC2 (refer to FIG. 8).

C1 and C2 are rotation matrices calculated as position correction information according to the principle illustrated in FIGS. 10 and 11, C1 is for correction of position coordinates of pixels of the first feature portion, and C2 is for correction of position coordinates of pixels of the second feature portion.

PC1set_3D is a matrix obtained by correcting positions of three-dimensional coordinates of the pixels of the first feature portion and PC2set_3D is a matrix obtained by correcting positions of three-dimensional coordinates of the pixels of the second feature portion.

When a spin axis vector as target final spin information is ω and a spin amount is α, a rotation matrix R(ω, α) may be calculated using ω and α. A correlation of R(ω, α), and PC1set_3D and PC2set_3D that are obtained by converting positions of pixels of the respective feature portions into three-dimensional coordinate information satisfies Equation 6 below.

$$R(\omega,\alpha)*PC1set\_3D = PC2set\_3D \quad \text{[Equation 6]}$$

Equations 4 and 5 above may be substituted into Equation 6 above to obtain a correlation represented in Equation 7 below.

$$PC2set\_3D = C2T*R(\omega,\alpha)*C1*P1set\_3D \quad \text{[Equation 7]}$$

Here, C2T is transposition of matrix C2.

According to Equation 7 above, position information of the pixels of the first feature portion may be converted into three-dimensional position information, and a resulting value may be obtained by applying position correction information and applying trial spin information to the three-dimensional position information. That is, trial spin information may be substituted into $R(\omega,\alpha)$ as target final spin information in Equation 7 above.

When Tset_3D is a result obtained by substituting a rotation matrix $R(\omega',\alpha')$ calculated using a trial spin axis vector $\omega'$ and a trial spin amount $\alpha'$ as trial spin information into Equation 7 above, Equation 8 below is satisfied.

$$Tset\_3D = C2T * R(\omega',\alpha') * C1 * P1set\_3D \quad \text{[Equation 8]}$$

When Tset is obtained by converting Tset_3D calculated according to Equation 8 above into a two-dimensional coordinate, if Tset and P2set correspond to each other, $R(\omega',\alpha')$ and $R(\omega,\alpha)$ have the same value, and thus, $R(\omega',\alpha')$ as the trial spin information $R(\omega',\alpha')$ may be determined as final spin information.

That is, trial spin information applied to Tset closest to P2set, that is, having highest similarity among a plurality of Tset to which different trial spin information is applied may be determined as the final spin information.

That is, if Tset and P2set are compared and the number of pixels having corresponding position coordinates is calculated, when the number of the corresponding pixels is equal to or greater than a predetermined level, or if similarity between pixels of Tset and pixels of P2set is calculated according to a predetermined function is equal to or greater than a predetermined level, trial spin information applied to the corresponding Tset is final spin information.

Here, the similarity may be determined, for example, based on a ratio of the number of the corresponding pixels to all pixels.

The aforementioned procedure of calculating spin of a moving ball will be described with reference to a flowchart of FIG. 12.

First, consecutive images of a moving ball are acquired (S10) and a background portion and so on are removed from each of the acquired images to extract respective source images (S12).

In addition, a ball portion is found from each source image to extract ball images (S20) and a ball feature portion is extracted from each of the ball images to prepare respective feature portion images (S30).

When a preceding image of two images among the consecutive feature portion images is referred to as a first feature portion image and a subsequent image of the two images is referred to as a second feature portion image, spin may be calculated using position information of pixels constituting the first feature portion on the first feature portion image and position information of pixels constituting the second feature portion on the second feature portion image.

That is, the position information of pixels constituting the first feature portion is converted into three-dimensional position information (S42) and position correction information is applied to the three-dimensional position information (S44).

In addition, a trial spin axis and a trial spin amount are extracted and applied to the three-dimensional position information (S52) and the three-dimensional position information is re-converted into two-dimensional position information (S54).

The two-dimensional position information converted in operation S54 is compared with the position information of the pixels constituting the second feature portion (S62). When the number of pixels having corresponding position coordinates is calculated, if the number is equal to or greater than a preset number (S64), the applied trial spin axis and spin amount is determined as a final spin axis and spin amount (S72).

When the calculated "number of corresponding pixels" does not reach a preset number, other trial spin axis and spin amount are applied to repeat operations S52, S54, S62, S64, and so on, a trial spin axis and a trial spin amount is determined as the final spin axis and spin amount when the "number of corresponding pixels" is highest.

Figure 12:
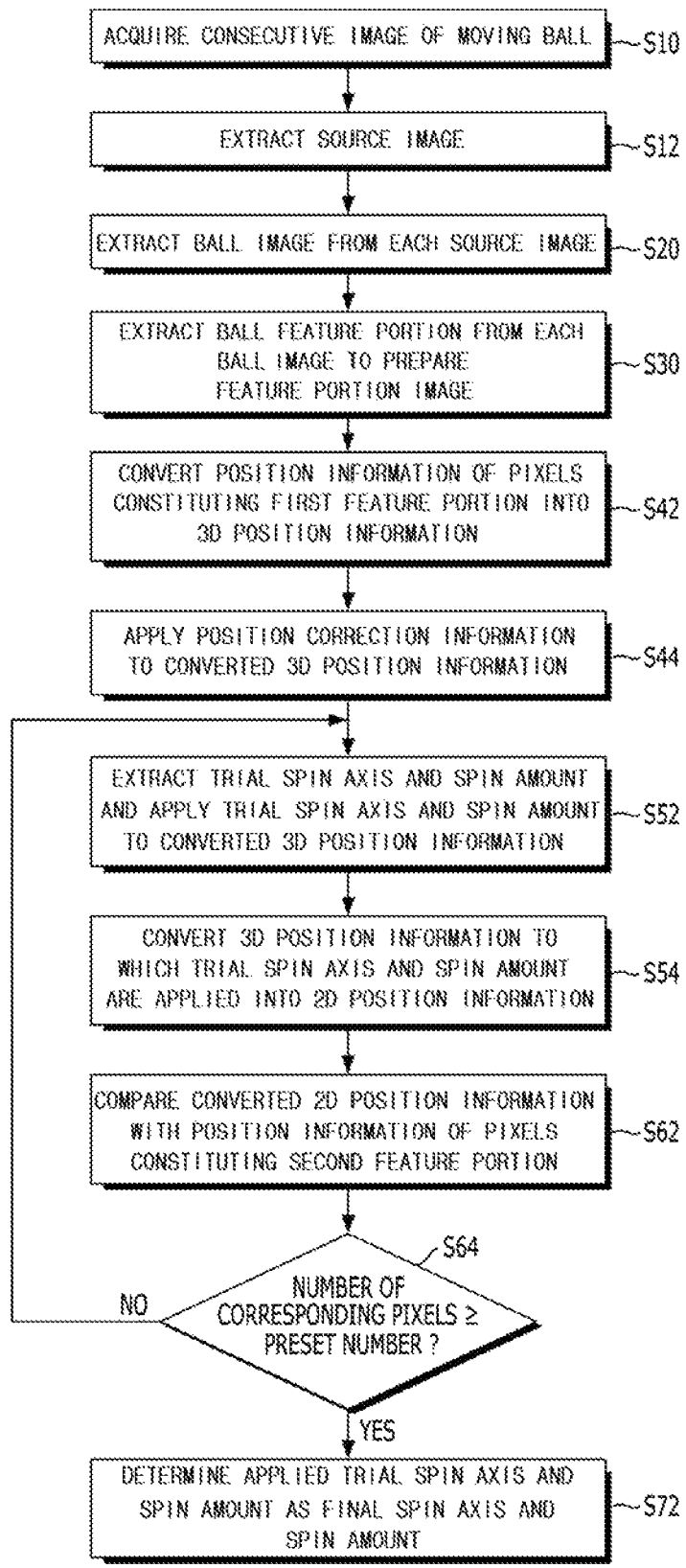
FIG. 12 is a flowchart for explanation of a method of sensing a moving ball according to an embodiment of the present invention.

Here, the flowchart of FIG. 12 illustrates the case in which a trial spin axis and a trial spin amount are finally selected when the "number of corresponding pixels" is equal or greater than a preset number. However, the present invention is not limited thereto. For example, a preset number may not be present with respect to the "number of corresponding pixels", different trial spin information may be repeatedly applied, and trial spin information may be finally selected when the "number of corresponding pixels" is highest.

In addition, instead of selecting final spin information through the number of pixels, similarity may be calculated according to a function and the final spin information may be selected according to the similarity.

Consideration of all of a pitch rotational component, a yaw rotational component, and a roll rotational component for applying a trial spin axis, as illustrated in FIG. 9 may mean consideration of significantly great number for extraction of trial spin axis and spin amount. Accordingly, a limited range for the trial spin axis may be reasonably set. Also, a limited range for a trial spin amount may also be reasonably set for applying the trial spin amount. Then, trial spin axis and spin amount information may be extracted mainly within the limited ranges to drastically reduce the number of cases to be considered and to significantly reduce computational load, thereby rapidly calculating spin.

That is, limited conditions for extraction a trial spin axis and a trial spin amount may be set in consideration of the characteristics of ball movement and a frame rate of a camera, thereby rapidly calculating spin.

When a golf ball is hit by a golf club, a pitch rotational component and a yaw rotational component are strongly represented among three rotational component of spin and a roll rotational component is not present or is almost negligible, as illustrated in FIG. 9.

That is, when the golf ball is hit, right and left side spin and forward and reverse spin are realized and a roll rotational component based on a proceeding direction of a ball is not present or is almost negligible.

Accordingly, a trial spin axis may be selected in consideration of only a pitch rotational component and a yaw rotational component while disregarding a roll rotational component to some extent, and thus, the number of cases to be considered may be significantly reduced.

When the golf ball is hit by the golf club, there is a limit in a rotation degree from a ball state of a captured image of one frame to a ball sate of a captured image of a subsequent frame.

That is, since there is a limit in maximum spin for rotation according to user hit and there is a limit in a frame rate of a camera for capturing an image, the number of cases to be considered for a trial spin amount may be largely limited.

Accordingly, as described above, limited ranges for a trial spin axis and a trial spin amount may be preset to reduce computation load, thereby rapidly calculating spin.

Thus far, the procedure of calculating spin information about only two images among consecutively acquired images has been described. Alternatively, several tens of frames to several thousands of frames may be acquired per second according to a camera, and the aforementioned spin calculation procedure may be performed on all of a plurality of consecutive images or some of the consecutive images only.

That is, the aforementioned spin calculation procedure may be performed on a plurality of pairs, each of which includes a preceding image and a subsequently acquired image of two consecutive images to obtain a plurality of spin information. The plural spin information may be slightly different and may be collected according to a preset function (for example, extraction of an average value or extraction of an average value of only several values with high similarity) to calculate final spin information, or spin information with highest similarity among the calculated plural spin information may be selected as the final spin information.

Various embodiments have been described in the best mode for carrying out the invention.

A method and apparatus for sensing a moving ball according to the present invention is applicable to an industrial field related to golf training including analyzing a ball in flight according to golf swing, a so-called screen golf industrial field providing a virtual reality-based simulation to allow a user to play a virtual golf game, and so on.

What is claimed is:

1. A method of sensing a moving ball, for acquiring and analyzing an image of the moving ball to calculate spin of the moving ball, the method comprising:

acquiring consecutive images by an image acquisition unit according to movement of a ball with a surface having a predetermined feature portion indicated thereon, wherein the feature portion is an unspecified indication including a ball's trademark or a logo and a scratch on the ball;

preparing a first image and a second image consecutively acquired by the image acquisition unit;

finding a ball portion on the first image and extracting the ball portion having a predetermined size from the first image as a first ball image;

finding a ball portion on the second image and extracting the ball portion having the predetermined size from the second image as a second ball image;

extracting the feature portion of the ball from the first ball image to prepare a first feature portion image;

extracting the feature portion of the ball from the second ball image to prepare a second feature portion image;

converting position information of each pixel on the first feature portion image into 3D position information, applying a trial spin axis and a trial spin amount to the converted 3D position information, and re-converting the 3D position information to which the trial spin axis and the trial spin amount have been applied into 2D position information, wherein the re-converted 2D position information is prepared as a trial spin feature portion; and comparing information of the trial spin feature portion with information of the second feature portion image to calculate a similarity, and determining the trial spin axis and the trial spin amount corresponding to the trial spin feature portion as a final spin axis and spin amount according to the similarity between information of the trial spin feature portion and information of the second feature portion image, wherein the method further comprises calculating position correction information for correcting a position and direction of a camera as if respective balls on consecutively acquired images are viewed at the same position and direction with respect to the camera, wherein the position correction information is applied to the converted 3D position information to apply the trial spin information and to calculate spin information.

2. A method of sensing a moving ball, for acquiring and analyzing an image of the moving ball to calculate spin of the moving ball, the method comprising:

acquiring consecutive images by an image acquisition unit according to movement of a ball with a surface having a predetermined feature portion indicated thereon, wherein the feature portion is an unspecified indication including a ball's trademark or a logo and a scratch on the ball;

preparing a first image and a second image consecutively acquired by the image acquisition unit;

finding a ball portion on the first image and extracting the ball portion having a predetermined size from the first image as a first ball image;

finding a ball portion on the second image and extracting the ball portion having the predetermined size from the second image as a second ball image;

extracting the feature portion of the ball from the first ball image to prepare a first feature portion image;

extracting the feature portion of the ball from the second ball image to prepare a second feature portion image;

searching for a trial axis and a trial spin amount in 3D space, for allowing the first feature portion image into the second feature portion image;

converting position information of each pixel on the first feature portion image into 3D position information, applying the searched trial spin axis and the searched trial spin amount to the converted 3D position information, and re-converting the 3D position information to which the trial spin axis and the trial spin amount have been applied into 2D position information, wherein the re-converted 2D position information is prepared as a trial spin feature portion; and comparing information of the trial spin feature portion with information of the second feature portion image to calculate the number of corresponding pixels between information of the trial spin feature portion and information of the second feature portion image; and determining the trial spin axis and the trial spin amount corresponding to the trial spin feature portion as a final spin axis and spin amount information according to the number of corresponding pixels between information of the trial spin feature portion and information of the second feature portion image, wherein the method further comprises calculating position correction information for correcting a position and direction of a camera as if respective balls on consecutively acquired images are viewed at the same position and direction with respect to the camera, wherein the position correction information is applied to the converted 3D position information to apply the trial spin information and to calculate spin information.

3. The method according to claim 2, wherein the trial spin axis information applied to the converted three-dimensional position information comprises spin amount information arbitrarily selected from a preset range according to maximum spin limitation for rotation by user hit and a frame rate of a camera for capturing an image.

4. The method according to claim 2, wherein the searching for of the spin axis and the spin amount comprises collecting based on a predetermined function a plurality of spin information calculated by performing the step of applying trial spin information, the step of comparing position information, and the step of determining the spin axis and spin amount of the trial spin information as final spin axis and spin amount for each of a plurality of pairs, each pair of images comprising a preceding one and a later one of two consecutive images to calculate the spin information of the moving ball.

\* \* \* \* \*